United States Patent [19]
Giacomelli et al.

[11] Patent Number: 5,826,407
[45] Date of Patent: Oct. 27, 1998

[54] METHOD OF ULTRASONICALLY VIBRATING A WORKPIECE

[75] Inventors: Peter Giacomelli, Lund, Sweden; Joe Kotarski, Plainfield, Ind.

[73] Assignee: Tetra Laval Holdings & Finance, S.A., Pully, Switzerland

[21] Appl. No.: 946,162

[22] Filed: Oct. 7, 1997

[51] Int. Cl.⁶ .................................................. B65B 51/10
[52] U.S. Cl. ........................ 53/477; 53/DIG. 2; 53/565; 156/580.1; 156/73.1
[58] Field of Search ................................ 156/73.1, 73.2, 156/580.1; 53/DIG. 2, 477, 565, 484

[56] References Cited

U.S. PATENT DOCUMENTS

| | | | |
|---|---|---|---|
| 2,621,704 | 12/1952 | Langer . | |
| 2,714,416 | 8/1955 | Fener . | |
| 3,610,506 | 10/1971 | Robinson | 156/73.1 |
| 3,822,465 | 7/1974 | Frankort et al. | 156/73.1 |
| 3,823,055 | 7/1974 | Schultz et al. . | |
| 4,040,885 | 8/1977 | Hight et al. | 156/380.1 |
| 4,047,992 | 9/1977 | Williams et al. | 156/73.1 |
| 4,159,220 | 6/1979 | Bosche et al. . | |
| 4,359,361 | 11/1982 | Wright . | |
| 4,549,684 | 10/1985 | Telly et al. | 156/73.1 |
| 4,631,685 | 12/1986 | Peter . | |
| 4,936,502 | 6/1990 | Schlarb et al. . | |
| 5,085,719 | 2/1992 | Eck | 156/73.1 |
| 5,304,265 | 4/1994 | Keeler . | |
| 5,472,549 | 12/1995 | Jurrius et al. . | |
| 5,605,026 | 2/1997 | Schott et al. | 53/DIG. 2 |
| 5,658,408 | 8/1997 | Frantz et al. | 156/73.1 |

*Primary Examiner*—James F. Coan
*Assistant Examiner*—Gene L. Kim
*Attorney, Agent, or Firm*—Michael A. Catania

[57] ABSTRACT

A method for producing ultrasonic vibrations at a preselected amplitude in a workpiece. The method includes the steps of: providing a clamping element having a surface to engage the workpiece; relatively moving the clamping element and workpiece between a) a first relative position wherein the surface of the clamping element is spaced from the workpiece and b) a second relative position wherein the surface of the clamping element is urged against the workpiece with a first predetermined force; energizing the surface of the clamping element from a) a first state wherein the surface of the clamping element is one of i) vibrating at a first amplitude and ii) not vibrating to b) a second state wherein the surface of the clamping element is ultrasonically vibrating at the preselected amplitude that is greater than the first amplitude; and coordinating relative movement between the clamping element and workpiece and energizing the surface of the clamping element to the predetermined amplitude so that the clamping element and workpiece realize the second relative position substantially at the same moment that the surface of the clamping element is energized to vibrate at the preselected amplitude.

1 Claim, 7 Drawing Sheets

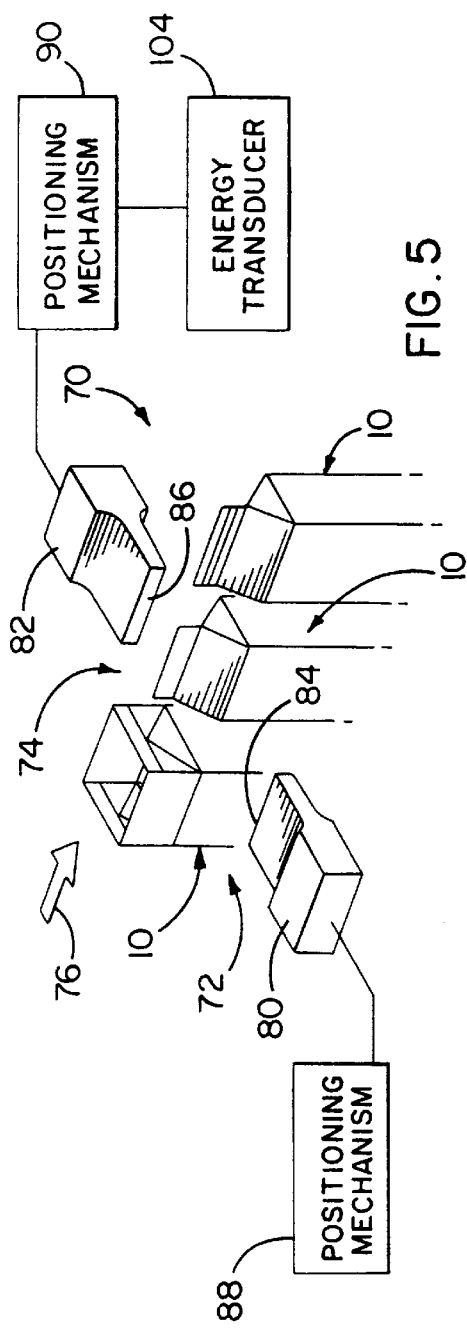
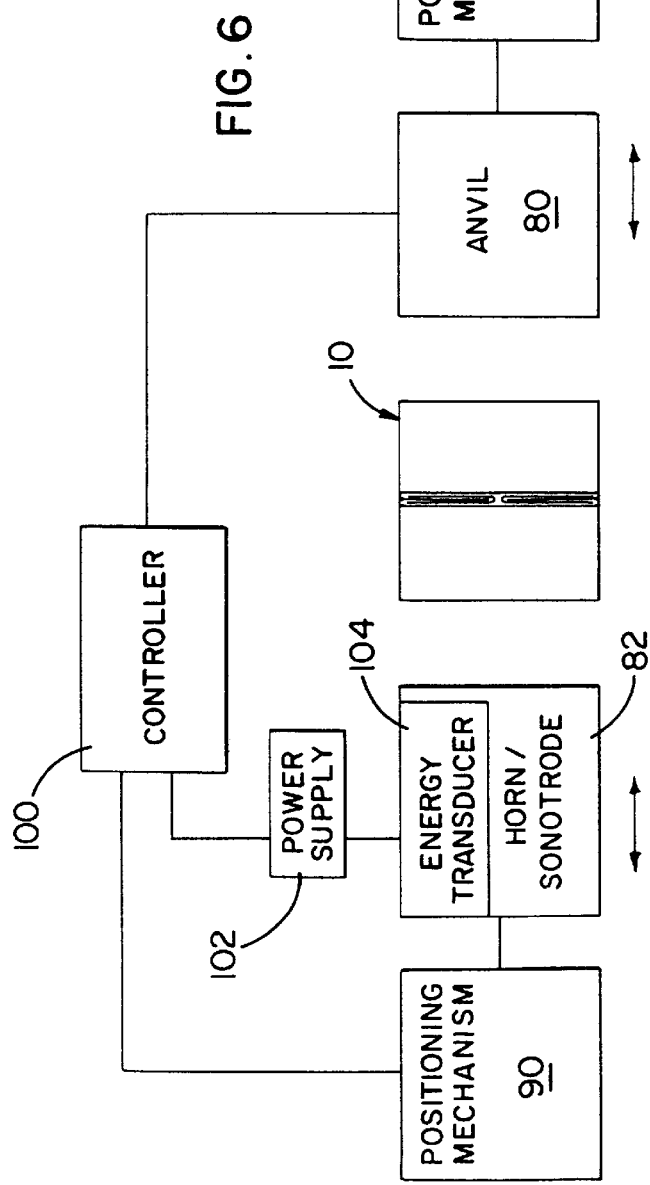
FIG. 5
FIG. 6

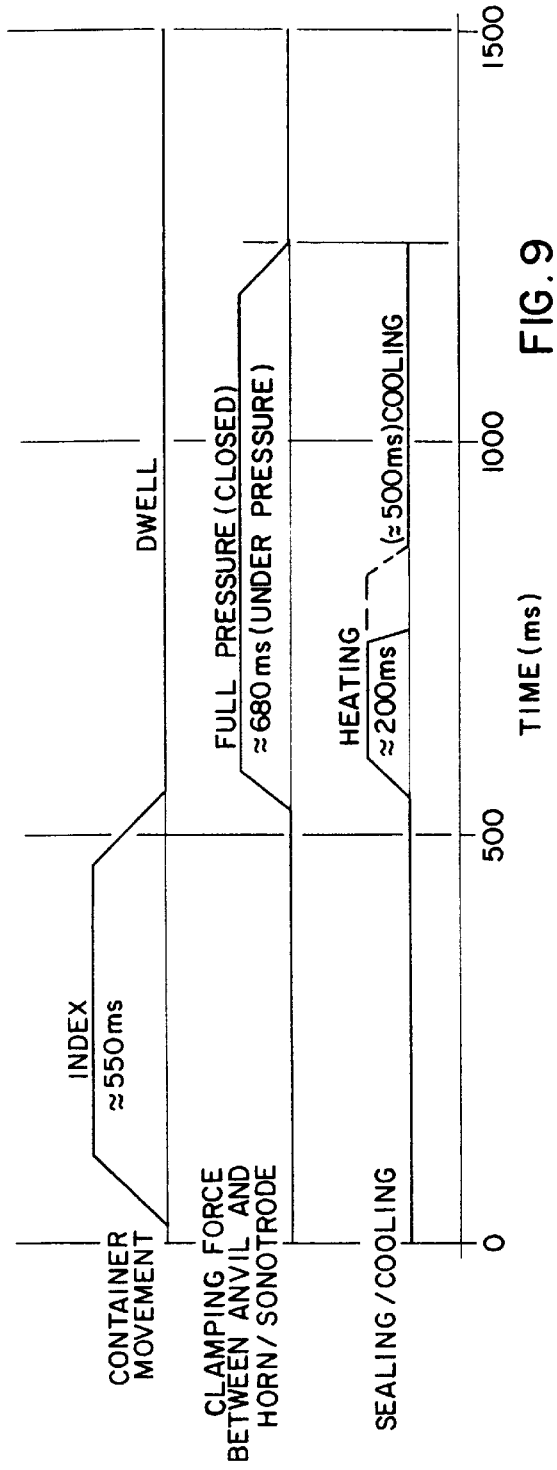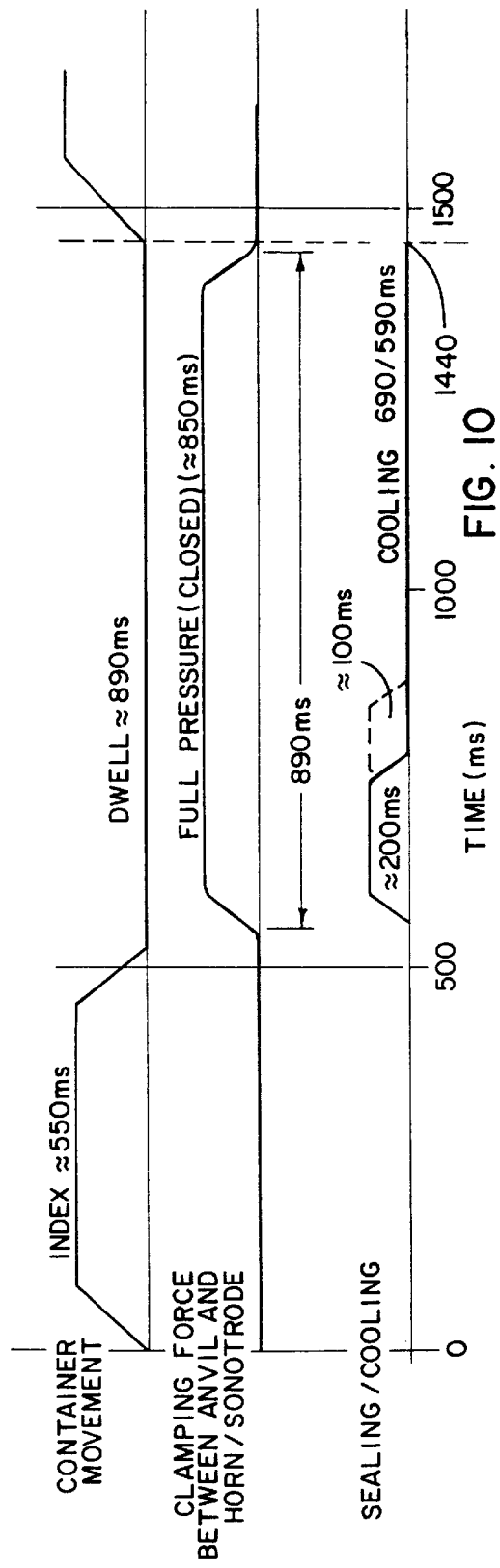

METHOD OF ULTRASONICALLY VIBRATING A WORKPIECE

BACKGROUND OF THE INVENTION

1. Field of the Invention

This invention relates to workpieces, such as containers erected from foldable blanks, and, more particularly, to a method of ultrasonically vibrating a part of the workpiece, as to effect a seal between portions thereof.

2. Background Art

Paperboard containers are used in a wide range of environments to define receptacles for both non-edible and edible products. In the latter case, it is generally necessary to maintain an aseptic environment within the container receptacle. Thus, hermetic sealing is required at all closure points. This is typically accomplished by coating the paperboard with a thermoplastic material, or other heat-sealable material, and heating discrete regions of the container to effect a seal between abutted portions thereof.

This type of container is commonly filled and sealed in high volumes, with some current lines operating at a rate of 16,000 containers per hour. Designers of filling lines for these containers contend with the competing objectives of filling and sealing the containers at high rates and effecting and maintaining high integrity seals in all critical areas.

In an exemplary filling line, paperboard blanks are advanced from station to station at which operations are serially performed to initially erect the container, thereafter fill the container, and ultimately close and seal an open end thereof. In the initial erecting stages, the blank is folded, as dictated by preformed fold lines, to define a continuous, peripheral wall structure which bounds a receptacle for product. One end of the container is folded to effect closing thereof. The other end has a filling opening through which product is introduced to the receptacle. After the container advances to, and is filled at, a filling station, the filled container is advanced to another station at which a closure portion of the container is reconfigured to close the filling opening. Commonly, the closure portion has a gabled construction with two gable panels which converge to a plurality of overlying fins. At a sealing station, the fins become captive between facing surfaces, one each on an anvil and a horn/sonotrode. The surfaces are repositioned to produce a predetermined clamping force on the fins. While this clamping force is maintained, the sonotrode is vibrated at ultrasonic frequencies at an operating amplitude for a predetermined time period to heat and thus melt the heat-sealable material to effect a seal between the fins.

It is desirable to minimize the time that each container must be kept at any one station in a line. The most time efficient manner of effecting a seal is to energize the sonotrode so that it is at all times vibrating at the operating amplitude. However, the sonotrode is commonly made from titanium which, if vibrated in air at the normal operating frequencies and amplitude, is prone to failure, as by cracking. To avoid this problem, it has heretofore been common to clamp the workpiece between the anvil and horn/sonotrode surfaces before energizing the horn/sonotrode. While this minimizes the likelihood of damage to the horn/sonotrode, it also introduces delays between the time that the horn/sonotrode is triggered and the time that the horn/sonotrode vibration reaches the desired operating amplitude. That is, initially there is a slight delay between the time that operation of the horn/sonotrode is triggered and the time that vibration is initiated. A second delay is experienced between the time that vibrations begin and vibrations reach the operating amplitude required for sealing.

U.S. Pat. No. 4,047,992 teaches the energizing of a horn at a preliminary low level of power, and upon the horn being within a predetermined distance from the workpiece or a predetermined sealing force being applied to the workpiece, increasing the power to the horn. This system requires a monitoring of relative positions between the horn and workpiece and/or the pressure applied to the workpiece through the horn.

SUMMARY OF THE INVENTION

In one form of the invention, a method is provided for producing ultrasonic vibrations at a preselected amplitude in a workpiece. The method includes the steps of: providing a clamping element having a surface to engage the workpiece; relatively moving the clamping element and workpiece between a) a first relative position wherein the surface of the clamping element is spaced from the workpiece and b) a second relative position wherein the surface of the clamping element is urged against the workpiece with a first predetermined force; energizing the surface of the clamping element from a) a first state wherein the surface of the clamping element is one of i) vibrating at a first amplitude and ii) not vibrating to b) a second state wherein the surface of the clamping element is ultrasonically vibrating at the preselected amplitude that is greater than the first amplitude; and coordinating relative movement between the clamping element and workpiece and energizing the surface of the clamping element to the preselected amplitude so that the clamping element and workpiece realize the second relative position substantially at the same moment that the surface of the clamping element is energized so that it is vibrating at the preselected amplitude.

The step of coordinating relative movement between the clamping element and workpiece and energizing of the surface of the clamping element may involve the step of energizing the surface of the clamping element to cause the surface of the clamping element to be vibrated before the clamping element and workpiece are moved from the first relative position towards the second relative position.

The method may further include the step of providing a workpiece with a container made from a paperboard material having a heat-sealable coating thereon that seals as an incident of being vibrated at the preselected amplitude.

The step of providing a workpiece may involve the step of providing a container made from a paperboard material having a heat-sealable coating thereon and which is folded to define a plurality of fins, with the step of relatively moving the clamping element and workpiece involving the step of relatively moving the clamping element and workpiece to the second relative position wherein the surface of the clamping element is urged against one of the fins.

The preselected amplitude may be on the order of 80 μm peak to peak.

The method may further include the step of cooling the workpiece with the clamping element urged against the workpiece.

In one form, the step of energizing the surface of the clamping element involves the step of energizing the surface of the clamping element with the clamping element and workpiece in the second relative position for a first predetermined time period. This method may further include the step of cooling the workpiece with the clamping element and workpiece in the second relative position for a second predetermined time period, with the second predetermined time period being no more than three times the first predetermined time period.

The clamping element may be energized for a time period on the order of 200–300 ms.

In one form, the workpiece is at a first station with the clamping element surface against the workpiece. The method may further include the steps of relatively moving the clamping element and workpiece from the second relative position into the first relative position and moving the workpiece away from the first station as the clamping element and workpiece are moved from the second relative position towards the first relative position.

The invention also contemplates a method of producing ultrasonic vibrations in a workpiece, which method includes the steps of: providing a first clamping element having a first surface to engage the workpiece and a second clamping element having a second surface to engage the workpiece; relatively moving the first and second clamping elements and workpiece between a) a first relative position wherein the first and second surfaces are spaced a first distance from each other and b) a second relative position wherein the first and second surfaces are moved from the first relative position towards each other so that the workpiece is captively held between the first and second surfaces with a predetermined clamping force; energizing the first surface from a) a first state wherein the first surface is not vibrating to b) a second state wherein the first surface is ultrasonically vibrating at a preselected operating amplitude; and coordinating relative movement between the first and second clamping elements and workpiece and energizing of the first surface so that the first and second clamping element and workpiece realize the second relative position substantially at the same moment that the first surface is energized so that it is vibrating at the preselected operating amplitude.

The first clamping element may be a horn/sonotrode, with the second clamping element being an anvil.

The invention is also directed to an apparatus for performing the above method.

BRIEF DESCRIPTION OF THE DRAWINGS

FIG. 5 is a perspective view of a line for serially erecting, filling, and sealing containers, according to the present invention;

FIG. 6 is a schematic representation of a system for closing and sealing a container, according to the present invention;

FIG. 9 is a timing chart for another system, according to the present invention, showing the coordination between container movement, clamping force between anvil and horn/sonotrode, and sealing/cooling;

FIG. 10 is a timing chart as in FIG. 9 for another system according to the present invention;

DETAILED DESCRIPTION OF THE DRAWINGS

Figure 1:
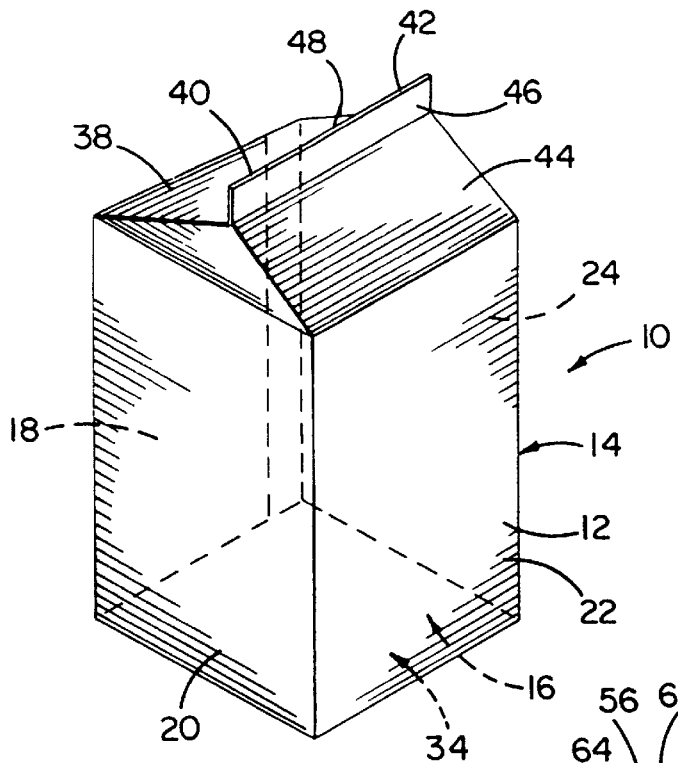
FIG. 1 is a perspective view of a completed container of the type that can be made according to the present invention.

Referring initially to FIGS. 1–4, a container is shown at 10, as one exemplary environment for the present invention. The container 10 is formed from a paperboard blank 12 which is coated on one or both sides with a thermoplastic material, such as polyethylene, or other known heat-sealable material. The blank 12 can be die cut from stock material and has preformed fold lines throughout to facilitate erection of the container to the completed state in FIG. 1.

The container 10 has a peripheral wall structure 14 which bounds a receptacle 16 for product to be stored. The peripheral wall structure 14 is defined in this embodiment by four contiguous wall panels 18, 20, 22, 24 which extend to wall panels 26, 28, 30, 32, which are reconfigurable in a conventional fashion to define a wall 34 which closes the bottom of the container 10.

The wall 18 extends upwardly to form a gable panel 38 which terminates at a fin 40 having a free end 42. The wall panel 22 similarly extends upwardly to a gable panel 44 and a fin 46 having a free end 48. The wall panel 20 extends upwardly to a flap 50 having a fin 52 with a free end 54. The wall 24 has a similar flap 56 with a fin 58 having a free end 60. The gable panels 38,44, flaps 50, 56, and fins 40, 46, 52, 58 cooperatively define a closure portion for the open upper end of the receptacle 16.

Figure 2:
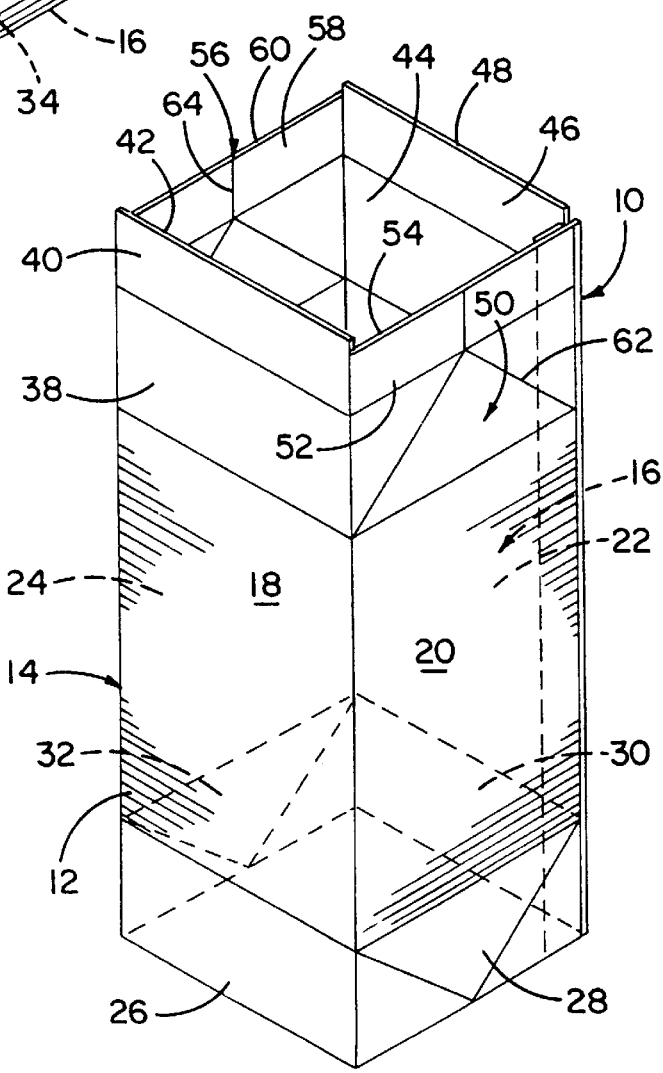
FIG. 2 is a perspective view of the container in FIG. 1 in a partially erected state.
Figure 3:
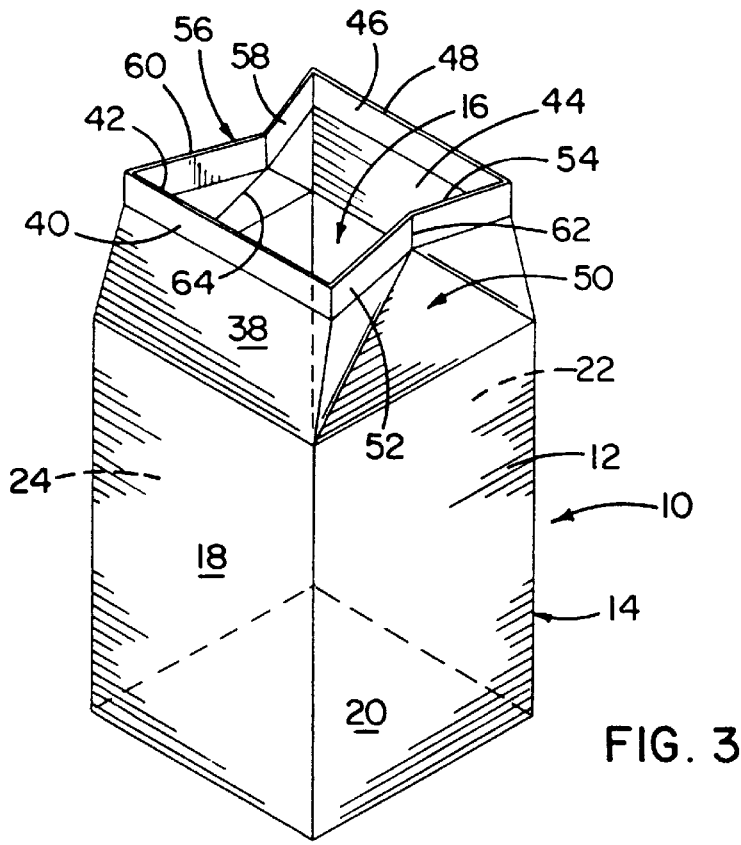
FIG. 3 is a view as in FIG. 2 with one end of the container closed and a closure portion on the other end of the container being reconfigured towards the closed state of FIG. 1.
Figure 4:
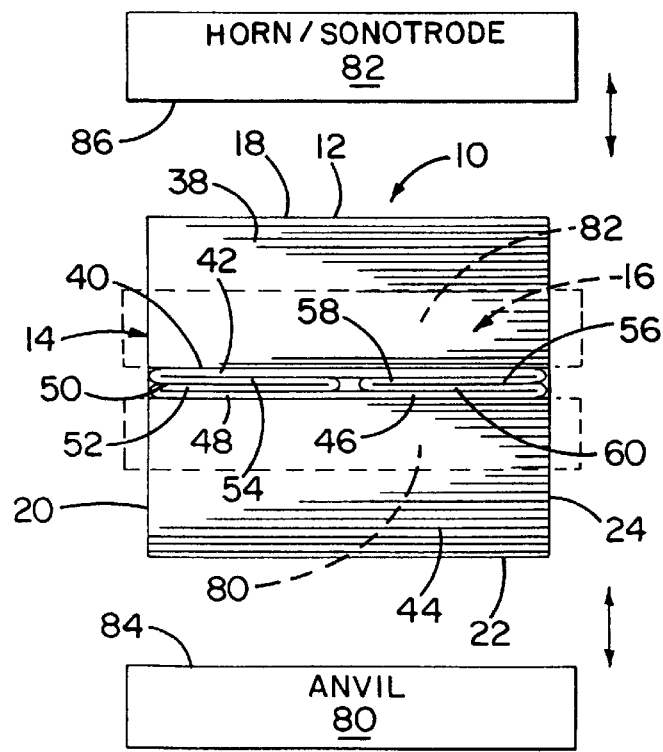
FIG. 4 is a plan view of the container in relationship to a schematic representation of an anvil and horn/sonotrode for sealing the closure portion.

An inverted, Y-shaped fold line 62 bisects the fin 52 and allows the flap 50 to collapse inwardly as shown in FIG. 3. A similar fold line 64 in the flap 56 allows the flap 56 to collapse inwardly towards the flap 50 as shown also in FIG. 3. With the fins 52, 58 each folded against themselves about the fold lines 62, 64, the fins 40, 46, 52, 58 assume a mutually overlying relationship as shown in FIG. 4. This represents the closed state for the closure portion. As shown in FIGS. 2, the fins 40, 46 may each extend upwardly a slight distance beyond the fin free ends 54, 60 so that in the closed state the fins 40, 46 are directly abuttable to each other adjacent to the free ends 42, 48 thereof. This arrangement is not, however, required.

In FIG. 5, an exemplary line is shown at 70 for serially filling, closing and sealing the containers 10. Two stations are shown, the first station 72 at which filling takes place and a second station 74 at which the containers 10 are closed and sealed. The containers 10 are advanced as by a chain conveyor in the direction of the arrow 76 to the first station 72, from the first station 72 to the second station 74, and from the second station 74 downstream.

The present invention is concerned with the sealing of the containers 10 as by exemplary structure shown in FIGS.

4–6. More specifically, ultrasonic sealing between the fins 40, 46, 52, 58 is effected using an anvil 80 and a horn/sonotrode 82 which are situated on opposite sides of the accumulated fins 40, 46, 52, 58. The anvil 80 has a surface 84 which can be selectively brought into contact with the fin 40. The horn/sonotrode 82 has an oppositely facing surface 86 which can be selectively brought into contact with the fin 46 with the container in a sealing position at the station 74. Through positioning mechanisms 88, 90, the anvil 80 and horn/sonotrode 82 can be advanced selectively towards and away from each other. More specifically, the anvil 80 and horn/sonotrode 82 are movable between a first relative position, shown in FIG. 5, wherein the surfaces 84, 86 are spaced from each other and the container fins 40, 46, and a second relative position, shown in phantom lines in FIG. 4, wherein the surfaces 84, 86 captively hold the fins 40, 46, 52, 58 in the overlying relationship of FIGS. 4–6. The anvil 80 and horn/sonotrode 82 act as jaws which, through the positioning mechanisms 88, 90, are capable of producing, through the surfaces 84, 86 thereon, a controllable clamping force upon the overlying fins 40, 46, 52, 58.

Additionally, the horn/sonotrode 82 and surface 86 thereon generate ultrasonic vibrations which are imparted to the fins 40, 46, 52, 58 to cause the heat-sealable material on the paperboard to effect a hermetic seal between a plurality of the fins 40, 46, 52, 58. Conventional ultrasonic sealing techniques are described in Tetra Laval Holdings Finance S.A.'s U.S. Pat. Nos. 5,564,225; 5,575,884; and 5,605,026, each of which is incorporated herein by reference.

In a production line, the container 10 is indexed to the station 74 and, through a controller 100, vibration of the horn/sonotrode surface 86 is triggered. More particularly, the controller 100 activates a power supply 102 that triggers an energy transducer 104 on the horn/sonotrode 82. Ultrasonic frequency vibrations are thereby generated, which increase in amplitude progressively to a preselected operating amplitude that effects heating of the coating on the paperboard and thus sealing between the fins 40, 46, 52, 58.

The system is designed so that a sealing vibrational "pulse" is imparted to the container 10 while the fins 40, 46, 52, 58 are maintained under a predetermined clamping force between the surfaces 84, 86. According to the invention, the controller 100 coordinates relative movement between the anvil 80 and the horn/sonotrode 82 and energizing of the surface 86 of the horn/sonotrode 82 so that the desired, predetermined clamping force between the surfaces 84, 86 is imparted, and the surface 86 of the horn/sonotrode reaches the operating vibrational amplitude, at the same moment. A typical operating vibrational amplitude is on the order of 80 μm peak to peak.

Figure 12:
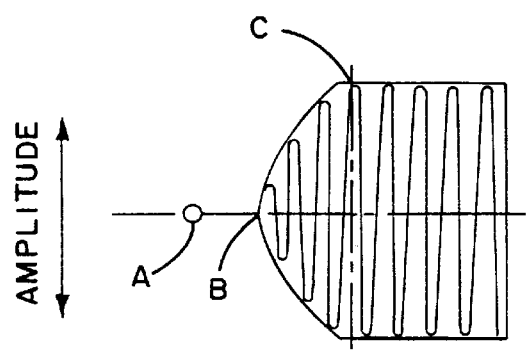
FIG. 12 is a graphical representation showing the time relationship between vibrational pulse and the pulse amplitude for a conventional horn/sonotrode.

To accomplish this, the system must accommodate two different stages of delay between a trigger point and the moment that the vibrations reach the full operating amplitude. More specifically, as shown in FIG. 12, between the trigger point A, at which the transducer 104 is energized, and the point B, at which vibration begins, there is a first delay. Between points B and C, the amplitude of the vibrations increases from a no vibration state (point B) progressively to the full operating amplitude (point C).

Figure 13:
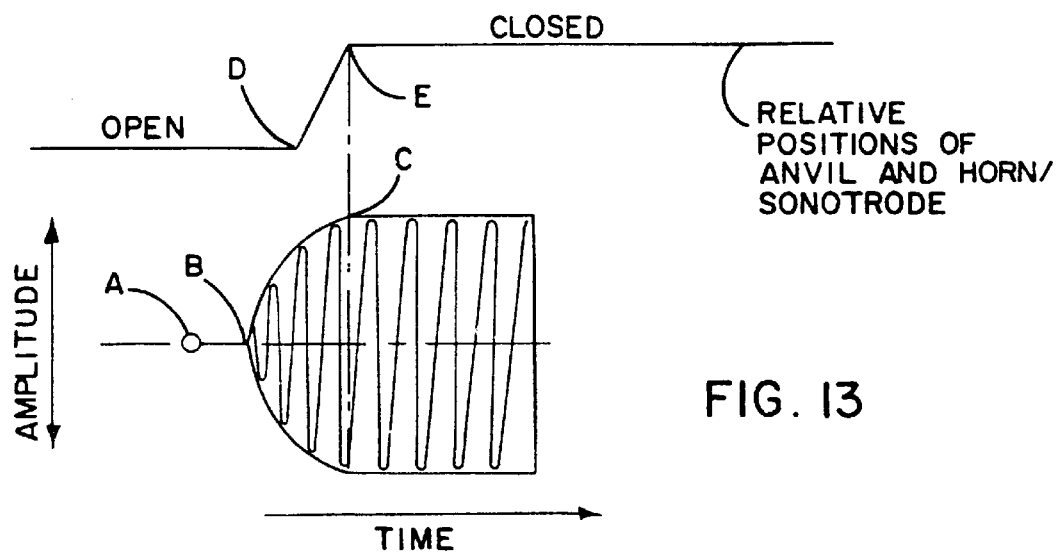
FIG. 13 is a graphical representation as in FIG. 11 for a system according to the present invention.

As shown in FIG. 13, according to the invention, operation of the transducer 104 is triggered at point A before movement of the anvil 80 and horn/sonotrode 82 is initiated at point D, from the first relative position/open position toward the second relative position/closed position (point E). The anvil 80 and horn/sonotrode 82 are moved from the open position towards the closed position at a time between points B and C to cause points E and C to coincide on the time scale. As a result, the horn/sonotrode 82 is not vibrated at the full operating amplitude, as might cause damage, before the anvil 80 and horn/sonotrode 82 are closed. At the same time, there is no delay that occurs between the time that the workpiece/container 10 is clamped between the anvil 80 and horn/sonotrode 82 in the closed position, with a preselected clamping force, and the time that vibrations at the full operating amplitude are imparted through the surface 86 to the container 10.

Figure 11:
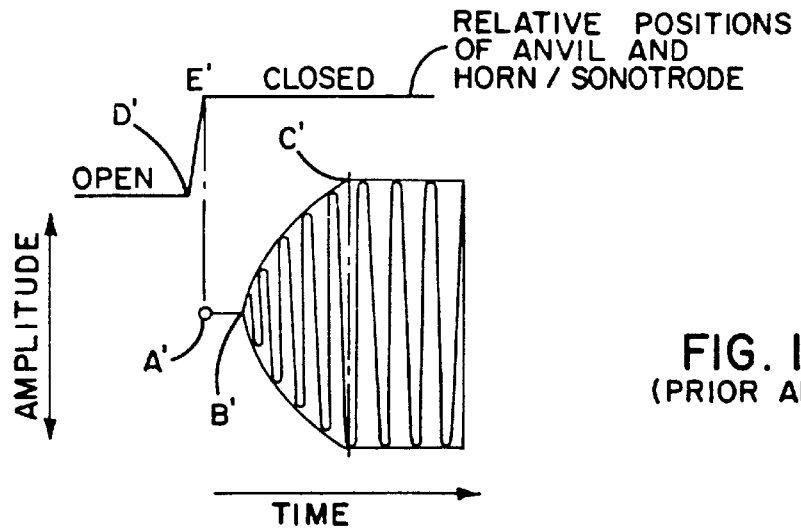
FIG. 11 is a graphical representation showing the coordination between the production of a clamping force on a workpiece between an anvil and horn/sonotrode and the imparting of vibrational forces through the horn/sonotrode to a workpiece in a prior art system.

This latter condition is shown in FIG. 11, which represents a prior art system. The trigger point A' and point E', at which the anvil and horn/sonotrode close, are at the same point on the time line. The trigger point A' for the vibrational pulse occurs after the point D' at which the anvil and horn/sonotrode are moved towards a closed position (i.e. clamped against the workpiece). While the workpiece is clamped, between the trigger point A' and the point B', no vibrations have been produced. The amplitude of the vibrations increases progressively between points B' and C', with there being an additional delay between the point B' at which vibration begins and point C' at which the vibrations reach the operating amplitude. A substantial amount of time is thus lost between points E' and C' during which no vibrations at the operating amplitude are imparted to the workpiece. In systems that are capable of operating at speeds as high as 18,000 packages per hour, lost milliseconds become very significant in terms of reduction in output.

Figure 7:
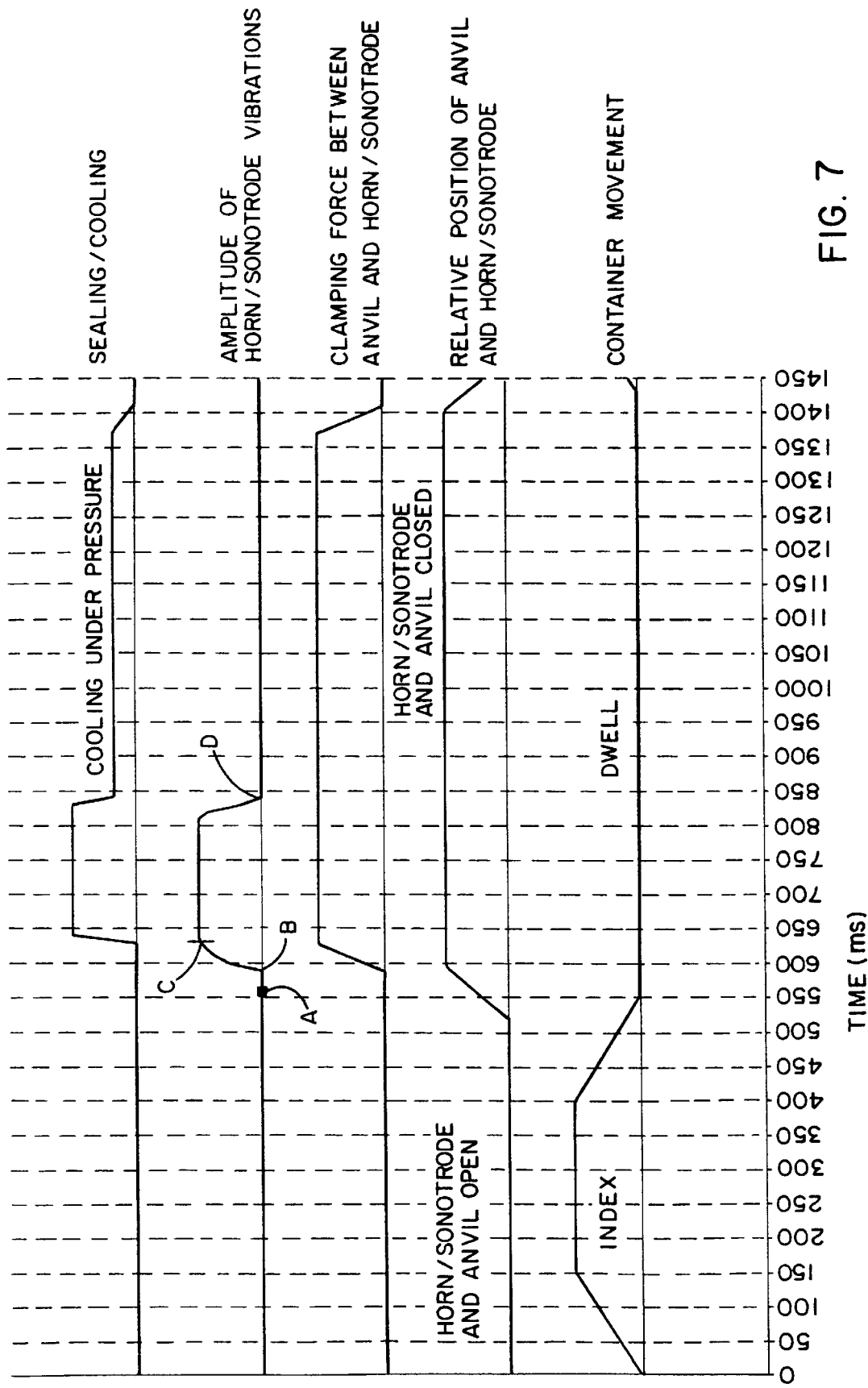
FIG. 7 is a timing chart showing the coordination between sealing/cooling, amplitude of horn/sonotrode vibrations, clamping force between anvil and horn/sonotrode, relative position of anvil and horn/sonotrode, and container movement for one exemplary system according to the present invention.

In FIG. 7, the coordination between sealing/cooling, amplitude of horn/sonotrode vibrations, clamping force between anvil and horn/sonotrode; relative position of anvil and horn/sonotrode; and container movement for an exemplary system, according to the invention, is shown. This particular embodiment uses a vibrational pulse between points C and D of approximately 220 milliseconds. At the termination of the pulse at point D, cooling takes place for approximately 540 milliseconds with the workpiece under the full clamping force between the anvil and the horn/sonotrode. The indexing movement of the container from the upstream station to the sealing station takes approximately 550 milliseconds. The container resides at the sealing station for approximately 890 milliseconds.

Figure 8:
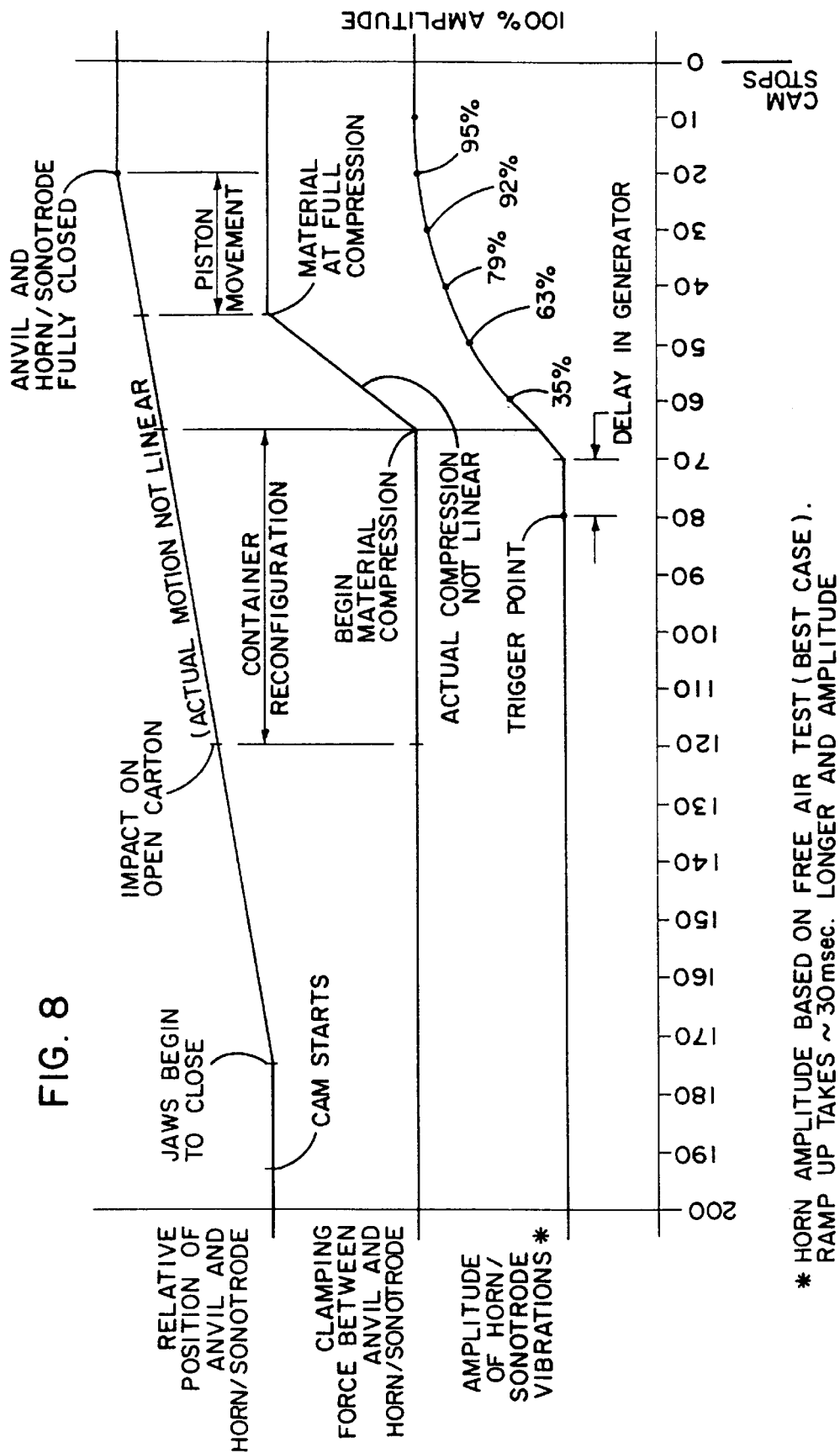
FIG. 8 is a timing chart as in FIG. 7 for another system, according to the present invention, and showing the coordination between the relative position of anvil and horn/sonotrode, clamping force between anvil and horn/sonotrode, and amplitude of horn/sonotrode vibrations.

FIG. 8 relates to another system, according to the invention, showing the coordination between the relative position of the anvil and horn/sonotrode, the clamping force between the anvil and horn/sonotrode, and the amplitude of the horn/sonotrode vibrations in relation to movement of a cam system operator.

FIGS. 9 and 10 graphically show the coordination between the container movement, the clamping force between the anvil and horn/sonotrode, and the sealing/cooling for two additional systems, according to the present invention.

In each of the inventive embodiments, the cooling time preferably is no more than three times the duration of the vibrational pulse.

The foregoing disclosure of specific embodiments is intended to be illustrative of the broad concepts comprehended by the invention.

We claim:

1. A method for ultrasonically sealing a plurality of top fin panels of a gable top carton on a packaging machine, the method comprising:

transporting the carton on a conveyor by an indexed movement to a filling station, the carton having an open top end to provide access to the interior of the carton;

filling the carton with a product;

providing an ultrasonic sealing station comprising an ultrasonic sonotrode disposed on one side of the conveyor and an anvil disposed opposite the sonotrode on the other side of the conveyor, and a transducer attached to the sonotrode for providing ultrasonic energy thereto, the anvil and sonotrode operably between an open position for receiving a carton and a closed position for sealing a carton;

energizing the transducer;

vibrating the sonotrode subsequent to energizing the transducer, the vibrations increasing in amplitude from a first amplitude at a first point in time to a full amplitude at a second point in time;

transporting the filled carton by the indexed movement to the ultrasonic sealing station, the plurality of top fin panels of carton transported between the anvil and the sonotrode while the anvil and the sonotrode are in an open position;

clamping the plurality of top fin panels between the sonotrode and the anvil immediately prior to the sonotrode vibrating at the full amplitude;

sealing the plurality of top fins by ultrasonic energy to create a top fin of a hermetically sealed carton; and releasing the top fin from the anvil and the sonotrode.

* * * * *